US006782653B1

(12) United States Patent
Thomas

(10) Patent No.: US 6,782,653 B1
(45) Date of Patent: Aug. 31, 2004

(54) WATERFOWL DECOY SYSTEM

(76) Inventor: Timothy D. Thomas, 10934 Eagle Run Dr., Parker, CO (US) 80138

( * ) Notice: Subject to any disclaimer, the term of this patent is extended or adjusted under 35 U.S.C. 154(b) by 0 days.

(21) Appl. No.: 10/367,376

(22) Filed: Feb. 13, 2003

Related U.S. Application Data

(63) Continuation-in-part of application No. 09/941,918, filed on Aug. 30, 2001.

(51) Int. Cl.[7] ........................................... A01M 31/06
(52) U.S. Cl. .................................................. 43/3; 43/2
(58) Field of Search ...................... 43/3, 2; 116/173; 40/218; 244/153 R, 154; 52/101; 256/1, 23; D22/125

(56) References Cited

U.S. PATENT DOCUMENTS

| | | | | |
|---|---|---|---|---|
| 261,910 A | * | 8/1882 | Cochel | 43/3 |
| 1,629,442 A | * | 5/1927 | Geisinger | 43/3 |
| 2,028,849 A | * | 1/1936 | Shay | 43/3 |
| 2,129,781 A | * | 9/1938 | Park | 43/3 |
| 2,174,211 A | * | 9/1939 | Hutaff, Jr. | 43/3 |
| 2,252,795 A | * | 8/1941 | Weems et al. | 43/3 |
| 2,392,011 A | * | 1/1946 | Stringer | 256/64 |
| 2,688,303 A | * | 9/1954 | Leander | 116/173 |
| 3,145,766 A | * | 8/1964 | Wickham et al. | 256/26 |
| 3,273,273 A | * | 9/1966 | McLarty | 116/173 |
| 3,436,856 A | * | 4/1969 | Miller | 43/3 |
| 3,476,929 A | * | 11/1969 | Klinger | 116/173 |
| 3,482,820 A | * | 12/1969 | Angello | 116/63 P |
| 3,645,026 A | * | 2/1972 | Lorch | 40/218 |
| 4,120,110 A | * | 10/1978 | Aeschliman | 43/3 |
| 4,172,335 A | * | 10/1979 | Farmer | 43/3 |
| 4,221,351 A | * | 9/1980 | Holland, Jr. | 244/153 R |
| 4,475,674 A | * | 10/1984 | Farmer | 43/3 |
| 4,674,219 A | * | 6/1987 | Chargo et al. | 43/3 |
| 4,813,369 A | * | 3/1989 | Moreland | 116/173 |
| 4,875,431 A | * | 10/1989 | Dobosz | 116/173 |
| 4,910,905 A | * | 3/1990 | Girdley et al. | 43/3 |
| 5,003,718 A | * | 4/1991 | Lenert et al. | 43/3 |
| 5,075,999 A | * | 12/1991 | Fredericks | 43/2 |
| 5,167,199 A | * | 12/1992 | Rehbein | 116/173 |
| D339,402 S | * | 9/1993 | Santos, Jr. | D22/125 |
| 5,322,032 A | * | 6/1994 | Kaleta | 116/209 |
| 5,377,611 A | * | 1/1995 | Crookham et al. | 116/173 |
| 5,423,281 A | * | 6/1995 | Crookham et al. | 116/173 |
| 5,572,824 A | * | 11/1996 | Szolis | 43/3 |
| 5,608,983 A | * | 3/1997 | Adams | 43/3 |
| 5,678,346 A | * | 10/1997 | Kellett | 43/2 |
| 5,832,649 A | * | 11/1998 | Kilgore | 43/2 |
| 5,903,997 A | * | 5/1999 | Jacob | 43/2 |
| 6,004,218 A | * | 12/1999 | Keating et al. | 256/24 |
| 6,044,581 A | * | 4/2000 | Shipman et al. | 43/3 |
| 6,142,701 A | * | 11/2000 | Falcon | 256/1 |
| 6,311,425 B1 | * | 11/2001 | Capps | 43/3 |
| 6,357,159 B1 | * | 3/2002 | Bowling | 43/2 |
| 6,357,160 B1 | * | 3/2002 | Hackman et al. | 43/2 |
| 6,374,529 B1 | * | 4/2002 | Petroski et al. | 43/3 |
| 6,412,210 B1 | * | 7/2002 | Horrell | 43/3 |
| 6,430,863 B1 | * | 8/2002 | Krag | 43/3 |
| 6,442,885 B1 | * | 9/2002 | Payne | 43/3 |

* cited by examiner

*Primary Examiner*—Darren W. Ark
(74) *Attorney, Agent, or Firm*—Edwin H. Crabtree; Ramon L. Pizarro; Donald W. Margolis

(57) ABSTRACT

A waterfowl decoy system used by one or more hunters for simulating large numbers of geese and ducks in a field or on a water surface. The system includes a plurality of decoy pennants attached to a decoy line. A plurality of decoy lines joined in series form a decoy line train. Opposite ends of each decoy line include a snap swivel for preventing the pennants and decoy line from becoming tangled. A portion of the decoy line is attached to a top of a line pole for suspending the decoy pennants above a ground surface or a water surface. Also, a portion of the decoy line can be connected to a decoy line animator for moving the decoy line and pennants from one position to another. The decoy system also includes a backpack or dolly with a vertical hand operated vertical spool for holding the pennants and decoy lines thereon and transporting the decoy system to and from the hunting area.

17 Claims, 2 Drawing Sheets

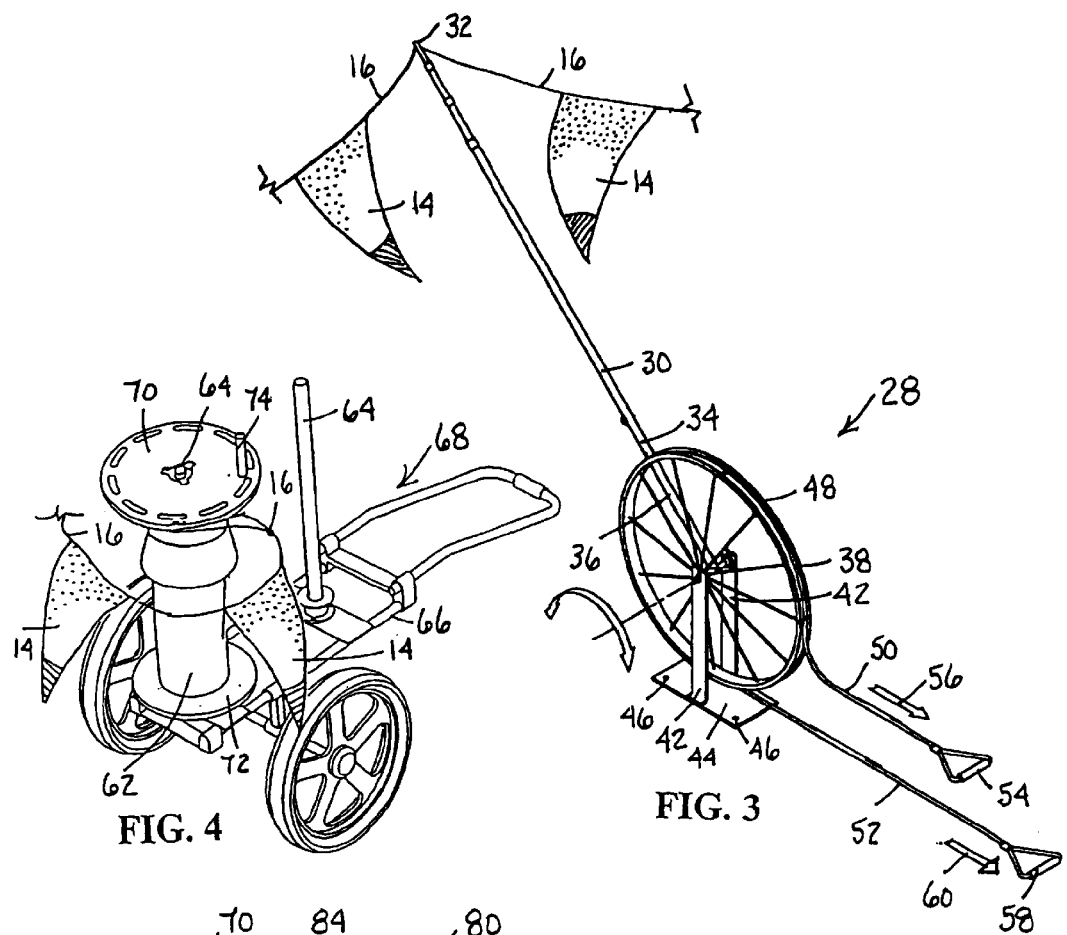
FIG. 4
FIG. 3
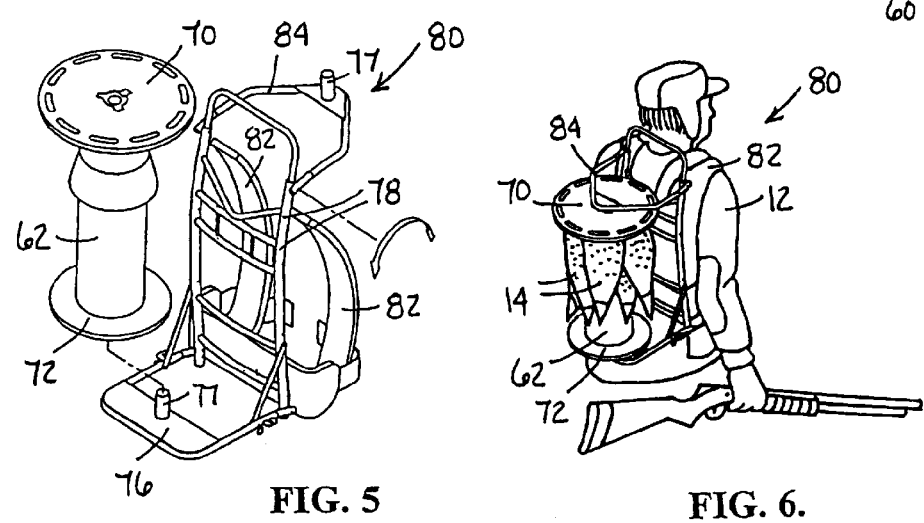
FIG. 5
FIG. 6.

WATERFOWL DECOY SYSTEM

This application is a continuation-in-part patent application based on an earlier filed patent application having a title "WATERFOWL DECOY SYSTEM", Ser. No. 09/941,918, filed on Aug. 30, 2001 by the subject inventor.

BACKGROUND OF THE INVENTION (a) Field of the Invention

This invention relates to decoys used in attracting waterfowl and more particularly, but not by way of limitation, to a decoy system which can be used to effectively attract and harvest different types of waterfowl on land and on water environments.

(b) Discussion of Prior Art

Heretofore, there have been a variety of different types of waterfowl decoys used when hunting ducks and geese. The decoys are made of wood, plastic and other materials and designed for floating on water or used in a field.

In U.S. Pat. No. 5,608,983 to Adams, U.S. Pat. No. 5,572,824 to Szolis and U.S. Pat. No. 5,003,718 to Lenert, et al., different types of recent decoy construction are described. In U.S. Pat. No. 4,674,219 to Chargo, et al., a waterfowl decoy assembly is illustrated having a decoy connected to a reel and anchor line. The anchor line is attached to an anchor for holding the decoy in place on top of a body of water. In U.S. Pat. No. 4,910,905 to Girdley, et al., a method and apparatus for simulating live waterfowl is disclosed using animated decoys on a water surface.

Recently, a Wisconsin hunter has used die-cut flying goose silhouettes. The silhouettes are attached to a line strung between two poles. These goose silhouettes are designed to add realism to a goose spread including shell type goose decoys.

None of the prior art patented duck and geese decoys mentioned above and the flying goose silhouettes on a pole line specifically provide the unique features, structure, objects and advantages of the subject waterfowl decoy system described herein.

SUMMARY OF THE INVENTION

In view of the foregoing, it is a primary objective of the subject invention to provide waterfowl hunters with a decoy system that is inexpensive, efficient in use and effective in attracting and harvesting different types of waterfowl.

Another object of the invention is the decoy system creates an illusion of large numbers of waterfowl actively feeding or resting, thereby appealing to their flock mentality and feeding frenzy instincts. The system includes a large number of various sizes of triangular decoy pennants, which can be designed and colored to simulate a particular type of goose or duck. The pennants can be made in different sizes such as 9 by 12 inches for ducks, 12 by 18 inches for snow geese and 18 inches by 24 inches for Canada geese.

Yet another object is the decoy system can be animated using jerk strings and an animator wheel. This feature feature enhances the decoy systems illusionary characteristics. The animator wheel also helps the decoy pennants depict geese and ducks landing, hopping into the air and moving from one feeding location to the next within the decoy spread.

A further object of the invention is it can be set up and quickly dismantled meeting certain state regulations requiring that no decoys can be left on public land overnight. The decoy system can be used on land and different bodies of water.

Still another object of the invention is the system is portable and can be carried on a backpack or on a dolly for ease in carrying to and from the field. The backpack can be used for carrying a small number of pennants while the dolly used for carrying large numbers of pennants The waterfowl decoy system includes a large number of triangular decoy pennants. The pennants have different colors and designs to simulate different types of geese and ducks. Up to ten pennants are attached to a decoy line. A plurality of decoy lines can be connected together in series using snap swivels to form a decoy line train. The decoy system can include 500, 1000, 2000 and more decoy pennants connected together in a single or multiple decoy line trains. The system also includes line poles having different lengths for holding the pennants and the decoy lines above the top of a land or water surface.

The system can include a decoy pennant animator attached to the middle of one of the decoy lines for moving and waving the decoy line back and forth with the pennants simulating geese and ducks landing, feeding, moving and hopping upwardly in a field. Also, the system can include one or more jerk strings attached on the decoy lines. When the jerk string is pulled by a hunter, the pennants are animated during calm wind conditions. Further, the jerk string can be pulled to add enhanced realism directly related to the landing and feeding behavior of the waterfowl.

A spool with spool handle is used for winding and unwinding the pennants and decoy line trains thereon for ease in deploying and retrieving the decoy system. The spool may be mounted on a backpack or on a wheel mounted dolly for ease in transporting the decoy system to and from the hunting site.

These and other objects of the present invention will become apparent to those familiar with various types of duck and goose decoys and different types of decoy hunting systems when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 3 is a perspective view of the decoy pennant animator attached to a middle of the decoy line for moving the decoy line with pennants back and forth and animating the pennants in the air above a ground surface.

FIG. 4 is a perspective view of a spool used for winding and unwinding decoy pennants and decoy lines thereon. The spool is removably mounted on a two-wheeled dolly for transporting the waterfowl decoy system to and from a hunting site.

FIG. 5 illustrates a perspective view of the spool positioned for mounting on a frame of a backpack.

FIG. 6 illustrates the backpack shown in FIG. 5 mounted on the back of a hunter with the spool having the decoy pennants and decoy lines wrapped thereon.

DESCRIPTION OF THE PREFERRED EMBODIMENTS

Figures 1, 2:
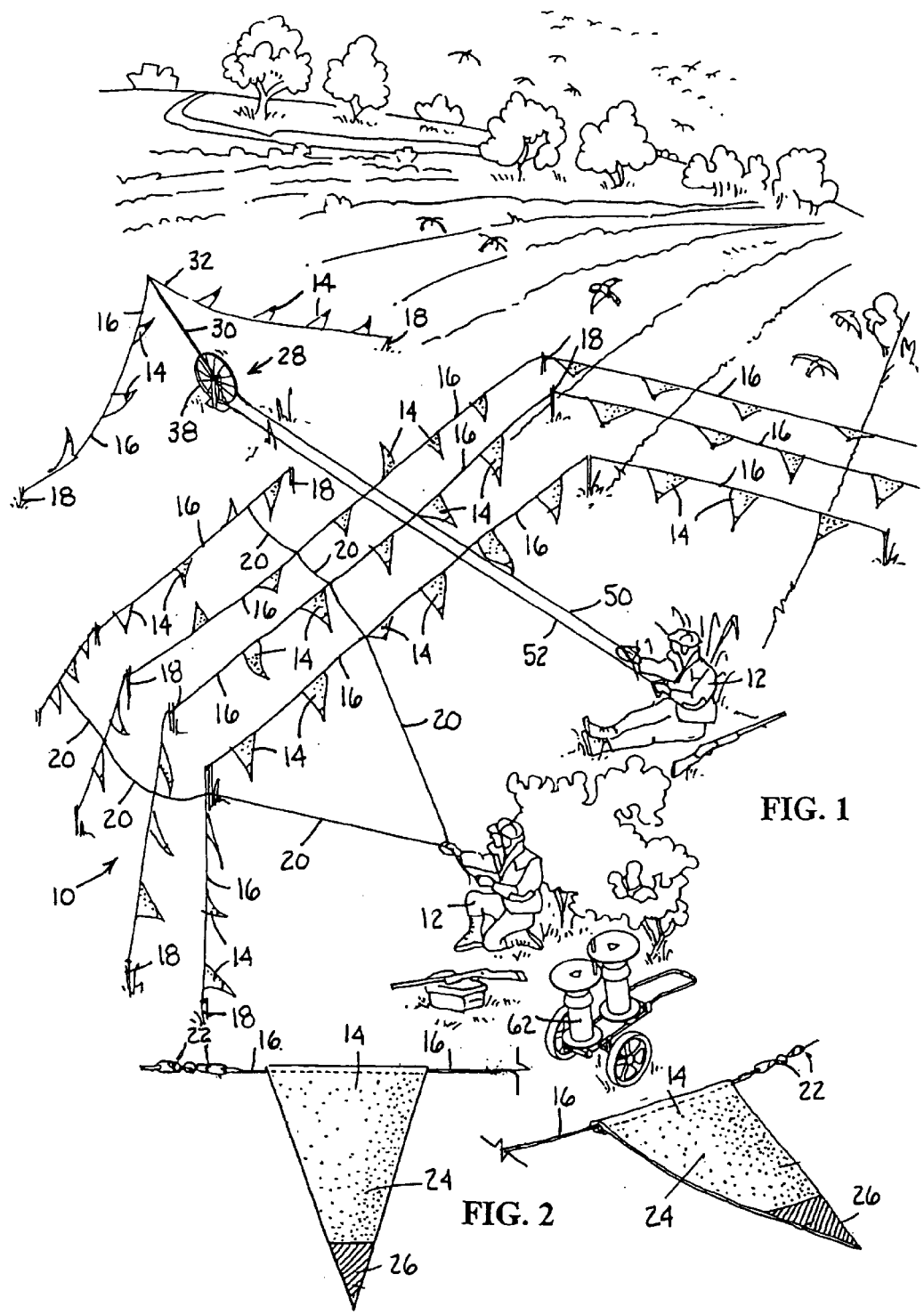
FIG. 1 is a perspective view of the decoy system mounted in a field location. A pair of jerk strings are shown being pulled by a first hunter for animating the decoy pennants and simulating ducks or geese feeding in a corn field. Also, a second hunter is shown operating a decoy pennant animator for moving a decoy line with pennants back and forth.
FIG. 2 is a front view and a perspective view of two of the decoy pennants attached to a decoy line. Typically ten of the pennants are attached to a single decoy line. Opposite ends of the decoy line are shown with snap swivels used for attaching additional decoy lines to form a decoy line train.

In FIG. 1, a perspective view of the subject waterfowl decoy system is illustrated and having a general reference numeral 10. The decoy system 10 is shown in a field setting with a pair of duck or goose hunters 12.

The system 10 includes a large number of triangular shaped decoy pennants 14. The pennants 14 are designed and colored to simulate different types of geese and ducks. A portion of each pennant 14 is attached to light weight decoy line 16. The decoy line 16 is shown in FIG. 2 and may be made of various weights of heavy duty fishing line and the like. For example, 80 lb. Dacron fishing line in lengths of 50 to 150 yards. The decoy line 16 can be semi-transparent and earth toned colors and is designed to blend into the ground or water background when in use. Typically the decoy line 16 includes ten decoy pennants 14. Opposite ends of the decoy lines 16 are joined together in series to form a decoy line train. The decoy line train can be of various lengths depending on the number of pennants desired.

A portion of each decoy line 16 is attached to the top of a number of upright line poles 18. The lines poles 18 can be made of wooden dowels and can vary in length from 24 to 48 inches in length and greater, as long as they are long enough to hold the pennants above a ground surface or a water surface. The bottom of each line pole 20 is inserted into the ground surface, as shown in the drawing. Typically, the line poles 18 are spaced apart at 5 to 10 foot intervals. Also, if the system 10 is used in a water setting, obviously the bottom of the poles 18 are inserted underwater for holding the pennants 14 and the decoy line 16 above the top of the water. Further, the waterfowl decoy system 10 may be set up with a series of parallel decoy lines 16. Still further, the length of the decoy lines 16 can be at various angles to each other, as shown in this drawing, to simulate ducks and geese feeding or resting in the cornfield. The number of pennants 14 may vary from a small number of 25 to 50 pennants in a decoy line train or up to 500 to 1000 pennants or more depending on the field conditions and the type of waterfowl being hunted.

As mentioned above, the pennants 14 can be made in different sizes, designs and color. For example, 9 by 12 inches for ducks and made in dark gray brown with green stripes or green patch, 12 by 18 inches for snow geese and made in white with a black tip and 18 inches by 24 inches for Canada geese and made in brown with black strips.

Also shown in FIG. 1 is one of the hunters 12 holding a pair of pull jerk strings 20 attached to a plurality of decoy lines 16. When one or both of the jerk strings 20 are pulled, the attached decoy lines 16 are pulled moving and animating the attached pennants 14. In this drawing, the jerk strings 20 are attached to four parallel rows of decoy lines 16.

In FIG. 2, a portion of one of the decoy lines 16 is shown with a front view of one of the pennants 14 and a perspective view on another pennant. The opposite ends of the decoy line 16 include a snap swivel 22 for attaching additional decoy lines 16 to make up the decoy line train. The snap swivels 22 allow the pennants 14 along the length of the decoy line 16 to rotate freely and prevent the pennants from tangling on the decoy line 16. In this drawing, the decoy pennants 14 have, for example, a base 24 colored brown with a black strip on a tip 26 of each pennant, to simulate the appearance of a Canada goose. The top of the base 24 of the pennants 14 is shown folded over a portion of the decoy line 16 and secured thereto.

In FIG. 3, a perspective view of a decoy line animator is shown and having a general reference numeral 28. The animator 28 includes a telescoping pole 30 having an upper end 32 attached to a midpoint of one of the decoy lines 16. The pole 30 can be extended in a range of 8 to 18 feet in length for holding the pennants 14 above the ground surface. A lower end 34 of the pole 30 is attached to a pole support 36. The pole support 36 is mounted on an animator wheel 38. The wheel 38 includes an axle 40 mounted on top of a pair of wheel posts 42. A lower end of the posts 42 is attached to the top of a stand 44. The stand 44 includes a plurality of spike holes 46. The spike holes 46 are used for receiving spikes or large nails and securing the animator 28 to the ground surface. The spikes and nails are not shown in the drawings.

Mounted on a rim 48 of the wheel 38 and at a 9 o'clock position are ends of a first pull cable 50 and a second pull cable 52. When the hunter 12 grips and pulls a first handle 54 attached to an opposite end of the first pull cable 50, the wheel 38 can be rotated up to 180 degrees clockwise from the 9 o'clock position to a 3 o'clock position, as indicated by arrow 56. This allows the hunter to move the decoy line 16 with pennants 14 from one position next to the ground surface to another position for simulating movement of a flock of ducks or geese feeding, hopping in the air and moving in a field. Also, the hunter 12 can use the animator 28 to move the pole 30 into an upright vertical position and move the decoy line 16 back and forth waving and animating the attached pennants 14.

The hunter 12, by pulling a second handle 58 attached to an opposite end of the second pull cable 52 indicated by arrow 60, can rotate the wheel 38 up to 180 degrees counterclockwise from the 3 o'clock position back to the 9 o'clock position. In this manner, the hunter using the two pull cables 50 and 52 can move the telescoping pole 30 back and forth from one position to another for attracting geese and ducks.

In FIG. 4, a perspective view of a spool 62 is shown and used for winding and unwinding decoy pennants 14 and decoy lines 16 thereon. The spool 62 is removably mounted on an upright first spool holder 64 attached to a frame 66 of a two-wheeled dolly. The dolly 68 is shown having a general reference, numeral 68. The dolly 68 is used for transporting the waterfowl decoy system 10 to and from a hunting site. The spool 62 includes an upper flange 70 and a lower flange 72. The upper flange 70 includes a handle 74 for winding and unwinding the pennants 14 and decoy lines 16 thereon. The dolly 68 also includes an upright second spool holder 64 for mounting a second spool 62 on the frame 66. Typically, the spool 62 will hold upward to 750 decoy pennants. Obviously, using a second spool 62, the hunter can carry up to 1500 pennants with decoy lines to the hunting site.

In FIG. 5, a perspective view of one of the spools 62 is shown positioned for mounting on a lower spool carrier 76 with a lower spool holder 77 attached to a frame 78 of a backpack. The backpack is shown having general reference numeral 80. The backpack 80 includes shoulder straps 82 attached to the backpack frame 78. Also, the backpack 80 includes an upper spool carrier 84 with an upper spool holder 77. The upper spool carrier 84 is shown pivoted upwardly and over the top of the frame 78 to the right for allowing the mounting of the spool 62 on the lower spool holder 77. When the upper spool carrier 84 is pivoted back over the top of the frame 78 to the left, the upper spool holder 77 engages the upper flange 70 of the spool 62 as shown in FIG. 6. In this position, the spool 62 can be rotated on the upper and lower spool holders 77 for winding and unwinding the pennants 14 and decoy lines 16.

In FIG. 6, the backpack 80 is shown mounted on the back of one of the hunters 12. In this drawing, the spool 62 is shown with the pennants 14 and decoy line train 18 wound thereon for transporting to and from a hunting site.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A waterfowl decoy system used by one or more hunters for simulating large numbers of geese or ducks on a ground surface of a field or on a water surface, the decoy system comprising:
   a plurality of decoy pennants, each of said pennants having a base and a tip, a portion of said bases attached to a decoy line, said base and said tip having different colors and designs for simulating different types of ducks and geese;
   a plurality of vertical line poles, a portion of said decoy line attached to a top of each of said line poles, said line poles suspending said decoy pennants downwardly with said tips of said decoy pennants disposed above the ground surface or the water surface when hunting geese or ducks; and
   a spool, said spool for winding and unwinding said decoy pennants and said decoy line thereon when transporting the decoy system to and from a hunting area.

2. The decoy system as described in claim 1 wherein said spool includes a spool handle, said spool removably mounted on a two-wheeled dolly.

3. The decoy system as described in claim 1 wherein said spool is removably mounted on a backpack.

4. The decoy system as described in claim 1 further including a jerk string, one end of said jerk string connected to said decoy line.

5. The decoy system as described in claim 1 further including a decoy line animator, said animator connected to a portion of said decoy line for moving said decoy line and attached pennants from one position to another.

6. A waterfowl decoy system used by one or more hunters for simulating large numbers of geese or ducks on a ground surface of a field or on a water surface, the decoy system comprising:
   a plurality of decoy pennants, each of said pennants having a base and a tip, a portion of said base attached to a decoy line, said base and said tip having different colors and designs for simulating different types of ducks and geese;
   a plurality of vertical line poles, a portion of said decoy line attached to a top of each of said line poles, said line poles suspending said decoy pennants downwardly with said tips of said decoy pennants disposed above the ground surface or the water surface when hunting geese or ducks; and
   a decoy line animator, said animator including an animator pole, said animator pole having one end attached to said decoy line for moving said decoy line and attached pennants from one position to another, an opposite end of said animator pole attached to an animator wheel, said animator wheel attached to one end of a pair of pull cables, said pull cables used for rotating said animator wheel in opposite directions.

7. The decoy system as described in claim 6 further including a jerk string, one end of said jerk string connected to said decoy line.

8. The decoy system as described in claim 7 wherein said jerk string is connected to a plurality of decoy lines with decoy pennants attached thereto.

9. The decoy system as described in claim 6 wherein opposite ends of said decoy line include a snap swivel for coupling together additional decoy lines to the opposite ends of said decoy line.

10. The decoy system as described in claim 6 further including a plurality of decoy lines with decoy pennants attached thereto, said decoy lines disposed parallel to each other when the decoy system is mounted on the ground surface or mounted above the water surface.

11. The decoy system as described in claim 6 further including a plurality of decoy lines with decoy pennants attached thereto, said decoy lines disposed at an angle to each other when the decoy system is mounted on the ground surface or mounted above the water surface.

12. The decoy system as described in claim 6 further including a spool with a spool handle for winding said decoy pennants and said decoy line on said spool when transporting the decoy system to and from a hunting area, said spool mounted on a two-wheeled dolly.

13. The decoy system as described in claim 6 further including a spool for winding said decoy pennants and said decoy line thereon when transporting the decoy system to and from a hunting area, said spool mounted on a backpack.

14. A waterfowl decoy system used by one or more hunters for simulating large numbers of geese or ducks on a ground surface of a field or on a water surface, the decoy system comprising:
   a plurality of decoy pennants, each of said pennants having a base and a tip, a portion of said bases attached to a plurality of decoy lines connected end to end, said base and said tip having different colors and designs for simulating different types of ducks and geese;
   a plurality of vertical line poles, portions of said decoy lines attached to tops of said line poles, said line poles suspending said decoy pennants downwardly with said tips of said decoy pennants disposed above the ground surface or the water surface when hunting geese or ducks; and
   a decoy line animator, said animator connected to a portion of one of said decoy lines for moving said one decoy line and attached pennants from one position to another, said decoy line animator including a telescoping animator pole, said animator pole having one end attached to said one decoy line, an opposite end of said animator pole attached to an animator wheel, said animator wheel mounted on a stand, said animator wheel attached to one end of a pair of pull cables with handles, said handles and said pull cables used for rotating said animator wheel in opposite directions and moving said animator pole from one position to another 15. The decoy system as described in claim 14 further including a jerk string, said jerk string connected to said decoy lines.

16. The decoy system as described in claim 14 further including a plurality of jerk strings, said jerk strings connected to said decoy lines.

17. The decoy system as described in claim 14 wherein opposite ends of said decoy lines include snap swivels for coupling together said decoy lines in senes.

* * * * *